(12) United States Patent
Yang et al.

(10) Patent No.: US 8,836,900 B2
(45) Date of Patent: Sep. 16, 2014

(54) ARRAY SUBSTRATE AND LIQUID CRYSTAL DISPLAY DEVICE

(75) Inventors: Ruizhi Yang, Beijing (CN); Jun Hwan Lim, Beijing (CN); Weiyun Huang, Beijing (CN)

(73) Assignees: Boe Technology Group Co., Ltd., Beijing (CN); Chengdu Boe Optoelectronics Technology Co., Ltd., Chengdu, Sichuan Province (CN)

( * ) Notice: Subject to any disclaimer, the term of this patent is extended or adjusted under 35 U.S.C. 154(b) by 114 days.

(21) Appl. No.: 13/326,742

(22) Filed: Dec. 15, 2011

(65) Prior Publication Data

US 2012/0154724 A1    Jun. 21, 2012

(30) Foreign Application Priority Data

Dec. 16, 2010  (CN) .......................... 2010 1 0606968

(51) Int. Cl.
G02F 1/1335 (2006.01)

(52) U.S. Cl.
USPC ........... 349/139; 349/160; 349/141; 349/126; 349/106; 257/88; 257/E27.12

(58) Field of Classification Search
CPC ................................................ G02F 1/133514
USPC .......... 349/139, 160, 141–146, 106–108, 126
See application file for complete search history.

(56) References Cited

U.S. PATENT DOCUMENTS

| | | | |
|---|---|---|---|
| 6,507,383 B1 * | 1/2003 | Abe et al. ....................... | 349/141 |
| 8,416,373 B2 * | 4/2013 | Li et al. ........................... | 349/106 |
| 2006/0055858 A1 * | 3/2006 | Nakanishi et al. ............ | 349/139 |
| 2006/0103940 A1 * | 5/2006 | Lo et al. ......................... | 359/619 |
| 2007/0030431 A1 * | 2/2007 | Lee et al. ....................... | 349/141 |
| 2007/0139598 A1 * | 6/2007 | Choi et al. ..................... | 349/139 |
| 2008/0002083 A1 * | 1/2008 | Kwon et al. ..................... | 349/43 |
| 2008/0007666 A1 * | 1/2008 | Takeda et al. ................... | 349/43 |
| 2008/0088788 A1 * | 4/2008 | Cho et al. ....................... | 349/160 |

(Continued)

FOREIGN PATENT DOCUMENTS

| | | |
|---|---|---|
| CN | 101266369 A | 9/2008 |
| CN | 101441370 A | 5/2009 |
| CN | 101484846 A | 7/2009 |
| CN | 10726908 A | 6/2010 |

OTHER PUBLICATIONS

First Chinese Office Action dated Jan. 28, 2014; Chinese Appln. No. 201110103362.X.

*Primary Examiner* — Edward Glick
*Assistant Examiner* — Sang V Nguyen
(74) *Attorney, Agent, or Firm* — Ladas & Parry LLP

(57) ABSTRACT

Disclosed are an array substrate and a liquid crystal display device. The array substrate comprises a base substrate, and data lines and gate lines, which are orthogonal to each other to define a plurality of pixel units, formed in a pixel region of the base substrate, with each of the pixel units comprising a switching element, a pixel electrode and a common electrode that is overlapped with the pixel electrode. The common electrode in each of the pixel units comprises slits, and the slits have a shape of curved line and are parallel to each other so as to form a slit region in the common electrode; and the pattern profile of the pixel electrode is parallel to the profile of the slit region of the common electrode.

16 Claims, 6 Drawing Sheets

(56) References Cited

U.S. PATENT DOCUMENTS

| | | | |
|---|---|---|---|
| 2008/0284967 A1* | 11/2008 | Oh et al. | 349/144 |
| 2009/0009671 A1* | 1/2009 | Wakabayashi | 349/33 |
| 2009/0109391 A1* | 4/2009 | Ito et al. | 349/141 |
| 2009/0128726 A1 | 5/2009 | Tanno | |
| 2009/0213287 A1* | 8/2009 | Chen | 349/39 |
| 2009/0219469 A1* | 9/2009 | Kim | 349/106 |
| 2009/0244460 A1* | 10/2009 | Arai et al. | 349/126 |
| 2009/0279027 A1 | 11/2009 | Nishida | |
| 2009/0310072 A1* | 12/2009 | Morii et al. | 349/126 |
| 2010/0103360 A1 | 4/2010 | Shimomaki | |
| 2010/0302492 A1* | 12/2010 | Kubota et al. | 349/138 |
| 2011/0194031 A1* | 8/2011 | Tsubata | 348/731 |

* cited by examiner

ARRAY SUBSTRATE AND LIQUID CRYSTAL DISPLAY DEVICE

BACKGROUND

Embodiments of the present disclosure relate to an array substrate and a liquid crystal display (LCD) device.

Liquid crystal display devices are common flat display devices at present, and thin film transistor liquid crystal display (TFT-LCD) devices are the popular kind of liquid crystal display devices in the market.

LCDs can be divided into types based on the form of driving electric field. FIG. 1A is a schematic diagram showing a configuration of pixel units in a conventional fringe-field switching (FFS) type TFT-LCD. As shown in FIG. 1A, the array substrate of the FFS type TFT-LCD can comprise a base substrate (not shown). Data lines 5 and gate lines 2, which are orthogonal to each other to define a plurality of pixel units, are formed in a pixel region (display region) in the central portion of the base substrate. Each of the pixel units may comprise a switching element TFT, a pixel electrode 11 and a common electrode 13, and the pixel electrode 11 and the common electrode 13 may be formed of transparent conductive materials such as indium tin oxide (ITO) or indium zinc oxide (IZO). The common electrode 13 is disposed in the entire region of the pixel unit, with a plurality of slits arranged regularly in parallel with the data line 5. During manufacturing of the array substrate, the pixel electrode 11 can be formed before the common electrode 13. The pixel electrode 11 is disposed in the entire region beside the gate line 2 and the data line 5 corresponding to the pixel unit, and is separated from the gate line 2 and the data line 5 by a distance. The pixel electrode 11 and the common electrode 13 are isolated by using a transparent insulation material. The switching element TFT can comprise a gate electrode 3, an active layer 6, a source electrode 7 and a drain electrode 8, and may be placed at a position where the gate line 2 intersects the data line 5. The drain electrode 8 and the pixel electrode 11 can be connected by via holes or directly; as shown in FIG. 1A, they are connected directly. The carrier migration between the source electrode 7 and the drain electrode 8 is controlled by the gate electrode 3 connected to the gate line 2. The liquid crystal molecules can be rotated by driving of the potential difference produced between the pixel electrode 11 and the common electrode 13. Then the transmittance of the liquid crystal cell can be controlled by a variety of potential differences so as to form different levels and thus realize displaying.

FIG. 1B is a schematic diagram showing an orientation state of the liquid crystal molecules in the conventional FFS type LCD. As shown in FIGS. 1B and 1A, during the driving operation, the liquid crystal molecules 20 in the liquid crystal cell are arranged in a vertical direction as shown in FIG. 1A when no electrical field is applied across the substrates; and the liquid crystal molecules 20 in the liquid crystal cell are arranged in a horizontal direction as shown in FIG. 1B after an electrical field is applied. Since the liquid crystal molecules in the liquid crystal cell are rotated in the same direction after the electrical field is applied, and the refraction index of the liquid crystal molecules is anisotropic, the liquid crystal display device is in different displaying states at different viewing angles, and the displayed colors at different viewing angles are also different, resulting in "color shifting."

A pixel configuration is proposed in order to reduce "color shifting", as shown in FIG. 1C, which is a schematic diagram showing another conventional pixel configuration. The gate electrode 3, the active layer 6, the source electrode 7, the drain electrode 8 and the pixel electrode 11 are similar to those shown in FIG. 1A, but the common electrode 13 has a configuration different from that shown in FIG. 1A. The common electrode 13 shown in FIG. 1C has curved slits in the horizontal direction, and a long-side midline of the slits is parallel to the gate line 2, with the curved point of the slits as a boundary line. Since the electrical field on both sides of the boundary line at the curved portion is symmetrical about the boundary line during the driving process and the crystal liquid molecules 20 are rotated in two directions opposite to each other, which are symmetrical about the boundary line, it is possible to realize self-compensation so that "color shifting" can be reduced to a certain extent.

However, in the pixel configuration shown in FIG. 1C, there are slits having a shape different from those of the curved slits or regions or no slit at the edge regions, such as the lower portion, the upper portion or the like. The electrical field produced in those regions is different from that produced in the regularly shaped slits, resulting in the liquid crystal molecules being rotated differently. As a result, the displaying effect of the entire pixel is affected disadvantageously, thus it is necessary to enlarge the area of the black matrix (BM) on the color filter substrate for shielding such regions. The aperture ratio and the transmittance of the liquid crystal cell are decreased and then the display contrast ratio is affected.

SUMMARY

Embodiments of the present disclosure intends to provide an array substrate and a liquid crystal display device for reducing the display difference in edge regions of the pixel units and increasing aperture ratio and display contrast ratio.

According to one embodiment of the present disclosure, an array substrate is provided. The array substrate comprises a base substrate, and data lines and gate lines, which are orthogonal to each other to define a plurality of pixel units, formed in a pixel region of the base substrate, with each of the pixel units comprising a switching element, a pixel electrode and a common electrode that is overlapped with the pixel electrode. The common electrode in each of the pixel units comprises slits, and the slits have a shape of curved line and are parallel to each other so as to form a slit region in the common electrode; and the pattern profile of the pixel electrode is parallel to the profile of the slit region of the common electrode.

According to another embodiment of the present disclosure, a liquid crystal display device comprising a liquid crystal panel is provided. The liquid crystal panel comprises a color filter substrate and the above-described array substrate. A liquid crystal layer is interposed between the color filter substrate and the array substrate, and a pattern profile of a black matrix on the color filter substrate and a pattern profile of the pixel electrodes in the pixel units of the array substrate are curved in the same direction.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

Hereinafter, embodiments of the disclosure will be described in detail with reference to the accompanying drawings so that the objects, technical solutions and advantages of the embodiments of the disclosure will become more apparent. It should be noted that the embodiments described below merely are a portion of but not all of the embodiments of the disclosure, and thus various modifications, combinations and alterations may be made on basis of the described embodiments without departing from the spirit and scope of the disclosure.

First Embodiment

Figure 1A:
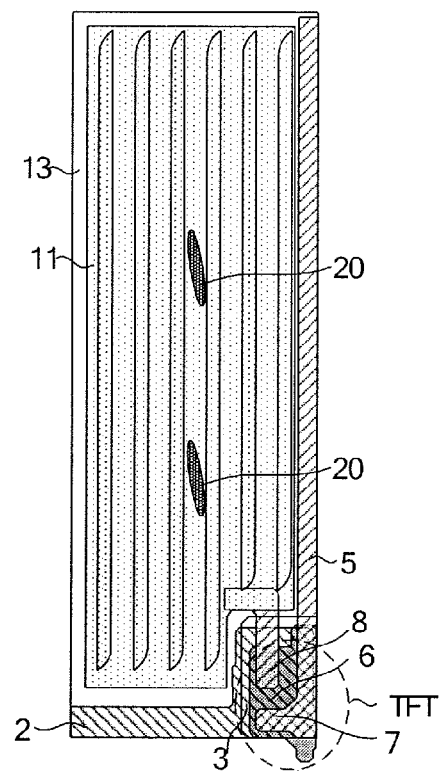
FIG. 1A is schematic diagram showing a configuration of a pixel unit in a conventional FFS type TFT-LCD.
Figure 1B:
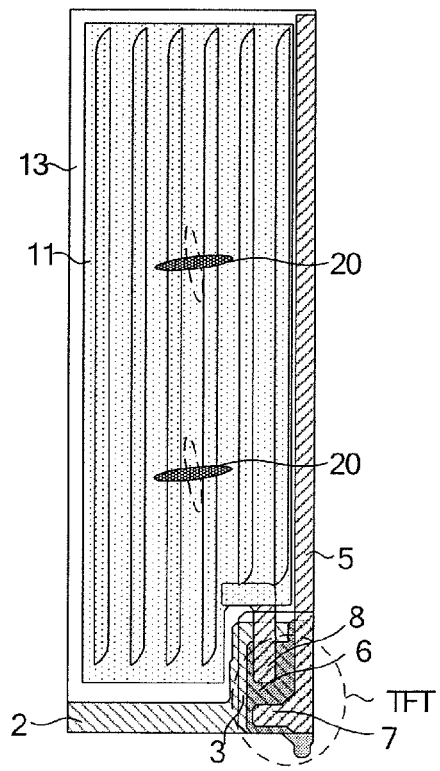
FIG. 1B is a schematic diagram showing an orientation state of liquid crystal molecules in the conventional FFS type TFT-LCD.
Figure 1C:
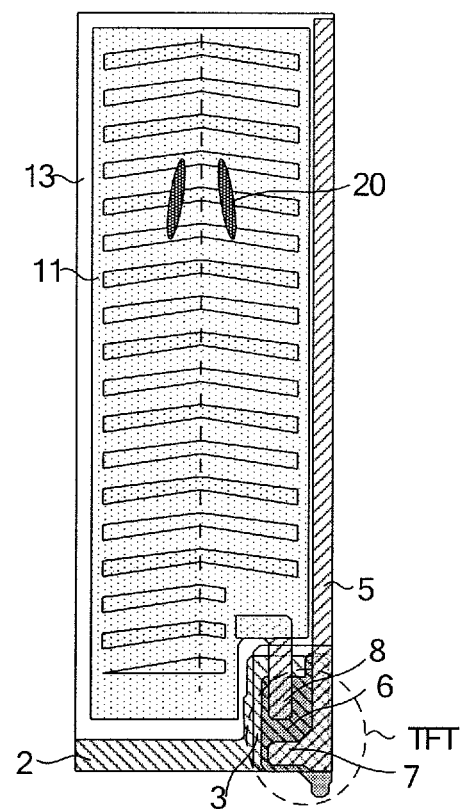
FIG. 1C is a schematic diagram showing a another conventional pixel configuration.
Figure 2A:
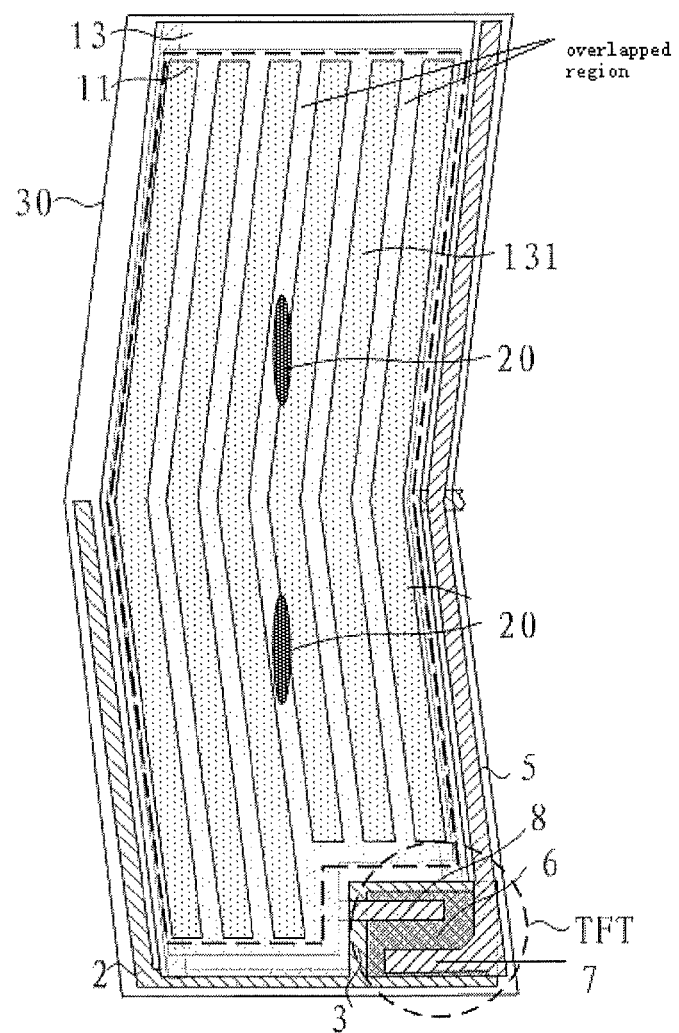
FIG. 2A is a plan-view schematic diagram showing a configuration of an array substrate according to a first embodiment of the disclosure.
Figure 2B:
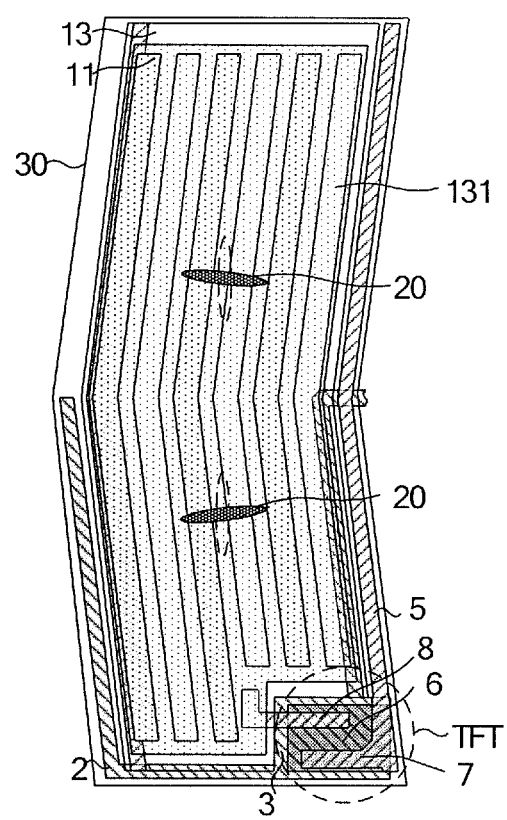
FIG. 2B is a schematic diagram showing an orientation state of liquid crystal molecules in the array substrate according to the first embodiment of the disclosure.

In the following, the array substrate according to the first embodiment of the disclosure will be described with reference to FIGS. 2A and 2B. FIG. 2A is a plan-view schematic diagram showing a configuration of an array substrate according to a first embodiment of the disclosure. As shown in FIG. 2A, the array substrate comprises a base substrate (not shown), and data lines 5 and gate lines 2, which are orthogonal to each other to define a plurality of pixel units 30, are formed in a pixel region (display region) in the central portion on the base substrate. Each of the pixel units 30 comprises a switching element TFT, a pixel electrode 11 and a common electrode 13, and the common electrode 13 comprises a plurality of slits 131 formed therein.

The pixel electrode 11 and the common electrode 13 are provided on different layers separated from each other with an insulation layer, and are overlapped with each other, so that a horizontal electric field to rotate liquid crystal molecules can be produced when a voltage difference is applied across the two electrodes. In FIG. 2A, as an example, the common electrode is disposed above the pixel electrode and the common electrode has curved slits. If the common electrode is disposed below the pixel electrode, the pixel electrode can have curved slits. As a result, the common electrode 13 and/or the pixel electrode 11 in each pixel unit 30 can have curved slits which are parallel to each other so as to form a slit region, as indicated with the region surrounded by the dashed line in FIG. 2A. The pattern profile of the pixel electrode 11 is parallel to the profile of the slit region, that is, the edges of the pixel electrode 11 are parallel to the corresponding edges of the slit region.

The switching element TFT can comprise a gate electrode 3, a source electrode 7 and a drain electrode 8, and a gate insulating layer and an active layer 6 are formed between the gate electrode 3 and the source and drain electrodes 7 and 8. The source electrode 7 is connected to the data line 5, and the drain electrode 8 is connected to the pixel electrode 11 by via holes in a passivation layer or directly overlapped with the pixel electrode 11. The pixel electrode 11 and the common electrode 13 are both disposed in the entire pixel unit besides the gate line 2 and the data line 5. The material of the pixel electrode 11 and the common electrode 13 can be a transparent conductive material such as indium tin oxide (ITO), indium zinc oxide (IZO) or the like, with an insulating layer being formed therebetween. The common electrode 13 has slits 131 and can produce a horizontal electrical field together with the pixel electrode 11 when a voltage is applied across them. The slits 131 of the common electrode 13 in each of the pixel units 30 have a shape of curved line, and the slits 131 are parallel to each other to form a slit region. The pattern profile of the pixel electrode 11 is parallel to the profile of the slit region. The symmetrical line of the curved slits 131 can be the long-side midline of the pixel electrode 11.

A liquid crystal panel of a liquid crystal display device can be formed by using the array substrate according to the embodiment of the disclosure and a color filter substrate, a liquid crystal layer is interposed between the array substrate and the color filter substrate, the rubbing direction of the array substrate and the rubbing direction of the color filter substrate are perpendicular to the short side of the pixel unit 30. For example, assuming that positive liquid crystal is used, an absorbing axis direction of a polarizer plate of the array substrate is parallel to the rubbing direction, and an absorbing axis direction of a polarizer plate of the color filter substrate is perpendicular to the rubbing direction. The liquid crystal molecules 20 are rotated by driving due to the electrical potential difference between the pixel electrode 11 and the common electrode 13 on the array substrate. As shown in FIG. 2A, since a long axis of the liquid crystal molecules 20 in the liquid crystal layer is parallel to the rubbing direction, the polarized light transmitted through the polarizer plate of the array substrate does not change its polarizing direction after passing through the liquid crystal layer. On the other hand, since a transmittance axis of the polarizer plate of the color filter substrate is perpendicular to the transmittance axis of the polarizer plate of the array substrate, the polarized light can not pass through the polarizer plate of the color filter substrate, and the liquid crystal play displays a black image. As shown in FIG. 2B, which is a schematic diagram showing an orientation state of liquid crystal molecules in the array substrate according to the first embodiment of the disclosure, different from FIG. 2A, when an electrical field is applied, the liquid crystal molecules 20 in the liquid crystal layer are rotated in two directions opposite to each other, the polarized light transmitted through the polarizer plate of the array substrate changes its polarizing direction after passing through the liquid crystal layer and can be transmitted partly through the polarizer plate of the color filter substrate. As a result, the liquid crystal display device can provide different transmittance ratio under different driving voltage and display at different gray scales.

In this embodiment, the common electrode of each of the pixel units has curved slits, and the pattern profile of the pixel electrode is parallel to the profile of the slit region of the common electrode, thus it is possible to make the shape of the entire pixel units be consistent with that of the produced electrical field, and make the electrical field produced uniformly in each of the pixel units. The configuration reduces the display difference in the edge regions of the pixel units, such as the lower portion or the upper portion of the pixel units, which is adjacent to the gate line and the data line, and increases the aperture ratio and the display contrast ratio. On the other hand, the pixel units can be divided into two parts at the position of the curved portion of the slits, and the liquid crystal molecules in the two parts are rotated in two directions opposite to each other when driven by the applied voltage difference. As a result, "color shifting" at different viewing angles due to anisotropy of the refraction index of the liquid crystal molecules can be self-compensated and in turn the displaying property of the liquid crystal display device can be further improved.

Although the above description is conducted by taking an FFS type LCD as an example, those skilled in the art can understand that the teaching of the disclosed technology can be applied to other types of LCDs, in which the common electrode may be or not overlapped with the pixel electrode of a pixel unit.

Second Embodiment

Figure 3:
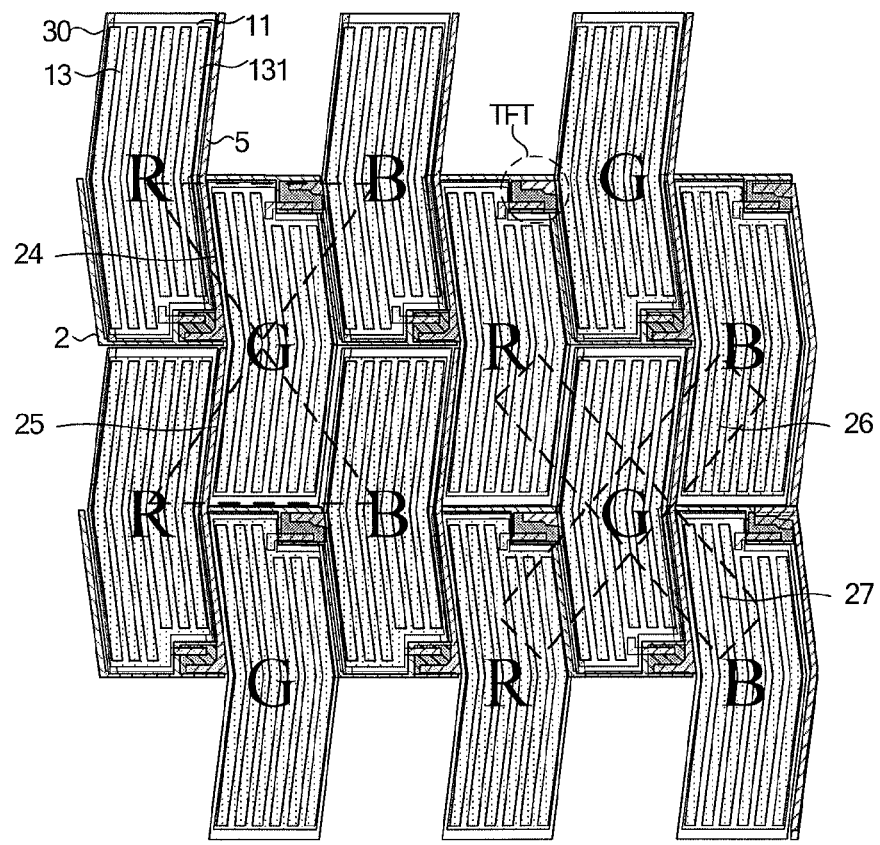
FIG. 3 is a plan-view schematic diagram showing a configuration of an array substrate according to a second embodiment of the disclosure.

In the following, the array substrate according to the second embodiment of the disclosure will be described with reference to FIG. 3. FIG. 3 is a plan-view schematic diagram showing a configuration of an array substrate according to the second embodiment of the disclosure. As shown in FIG. 3, the array substrate comprises a base substrate (not shown), and data lines 5 and gate lines 2, which are orthogonal to each other to define a plurality of pixel units 30, are formed in the pixel region of the base substrate. Each of the pixel units 30 comprises a switching element TFT, a pixel electrode 11 and a common electrode 13, and the common electrode 13 is formed with slits 131. For example, the slits 131 of the common electrode 13 in each of the pixel units 30 have a shape of curved line, and the slits 131 are parallel to each other so as to form a slit region. The pattern profile of the pixel electrode 11 is parallel to the profile of the slit region, and the gate line 2 and/or the data line are parallel to the pattern profile of the adjacent (or corresponding) pixel electrodes.

Further, the patterns of the pixel electrodes 11 are curved in opposite directions to each other in the pixel units 30 of the adjacent columns, and the pixel electrodes 11 in the adjacent columns are displaced in a stagger manner to enable the curved patterns to match with each other.

In this embodiment, since each gate line 2 is parallel to the pattern profile of the adjacent pixel electrode 11, and the pixel electrodes 11 in the adjacent columns are displaced in a stagger manner, the formed gate line 2 has a shape similar to "⌊⌋" or "⌈⌉". In addition, since each data line 5 is parallel to the pattern profile of the adjacent pixel electrode 11, the data line 5 is formed to have a shape of the same curve direction and angle as those of the slits 131 of the common electrode 13.

Since each pixel of the liquid crystal display device corresponds to three sub-pixels of different color filter (RGB) on the color filter substrate, various colors can be displayed by combining the sub-pixels at different gray scales, and each of the sub-pixels corresponds to one pixel unit 30 of the array substrate. In the pixel units 30 of the array substrate according to the embodiment of the disclosure, since the pixel electrodes 11 in the adjacent columns are displaced in a stagger manner, the pixel units 30 in each of the adjacent columns are not displaced in the same row. If the pixel units 30 corresponding to each one of the colors are displaced in the same column continuously in the liquid crystal display device comprising the array substrate according to the embodiment of the disclosure, the following color mixing modes can be used, as shown in FIG. 3:

Color mixing mode A: the pixel unit corresponding to color G, the pixel unit at its top left corner corresponding to color R, the pixel unit at its top right corner corresponding to color B are combined as one pixel to realize mixing of colors;

Color mixing mode B: the pixel unit corresponding to color G, and the pixel unit at its down left corner corresponding to color R, and the pixel unit at its down right corner corresponding to color B are combined as one pixel to realize mixing of colors;

Color mixing mode C: the pixel unit corresponding to color G, the pixel unit at its down left corner corresponding to color R, and the pixel unit at its top right corner corresponding to color B are combined as one pixel to realize mixing of colors; and Color mixing mode D: the pixel unit corresponding to color G, the pixel unit at its top left corner corresponding to color R, and the pixel unit at its down right corner corresponding to color B are combined as one pixel to realize mixing of colors.

In the embodiment of the disclosure, the above several color mixing modes can be used separately or in combination. In addition, the modes above are given as an example, and there are other color mixing modes.

In this embodiment, the common electrode of each of the pixel units has curved slits, and the pattern profile of the pixel electrode is parallel to the profile of the slit region of the common electrode, thus it is possible to make the shape of the entire pixel units be consistent with the curved electrical field, and make the electrical field produced uniformly in each of the pixel units. The configuration enables the display difference in the edge region of the pixel units, such as the lower portion or the upper portion of the pixel units, which are adjacent to the gate line and the data line, to be reduced, and the aperture ratio and the display contrast ratio to be increased. On the other hand, the pixel units can be divided into two parts at the position of the curved portion of the slits, and the liquid crystal molecules of the two parts are rotated in two directions opposite to each other with the diving of the voltage. As a result, "color shifting" at different viewing angle due to anisotropy of the refraction index of the liquid crystal molecules can be self-compensated and in turn the displaying property of the liquid crystal display device can be further improved. The pixel electrodes in the adjacent columns are displaced in a stagger manner and the pixel units corresponding to each one of the colors are displaced in the same column continuously and can take one of the several color mixing modes described above, so more complicated information can be displayed in the same pixel precision. In addition, more exquisite picture can be displayed, and then the displaying effect and the picture quality can be further improved.

Third Embodiment

Figure 4:
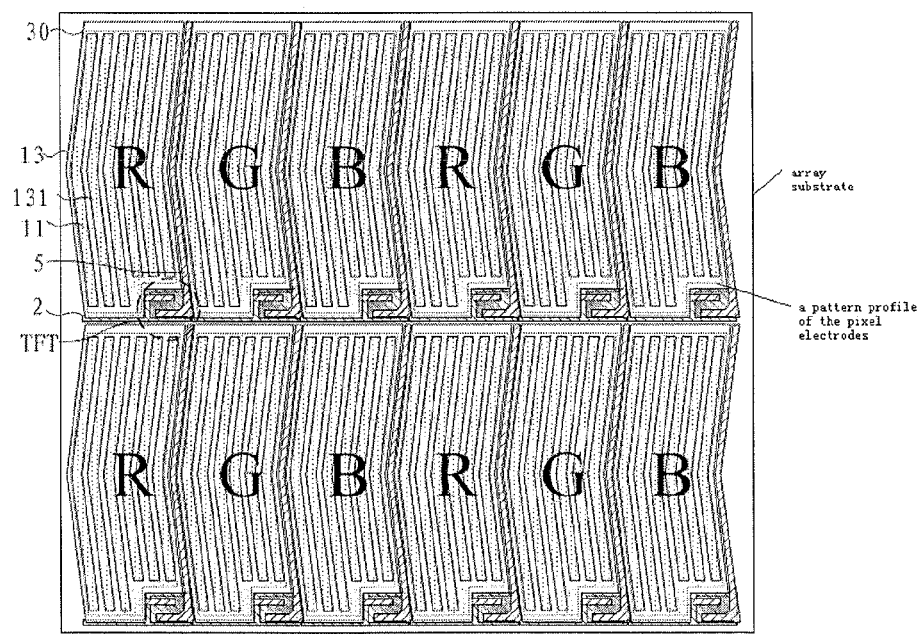
FIG. 4 is a plan-view schematic diagram showing a configuration of an array substrate according to a third embodiment of the disclosure.

In the following, the array substrate according to the third embodiment of the disclosure will be described with reference to FIG. 4. FIG. 4 is a plan-view schematic diagram showing a configuration of an array substrate according to the third embodiment of the disclosure. As shown in FIG. 4, the array substrate comprises a base substrate (not shown), and data lines 5 and gate lines 2, which are orthogonal to each other to define a plurality of pixel units 30, are formed in a pixel region of the base substrate. Each of the pixel units 30 comprises a switching element TFT, a pixel electrode 11 and a common electrode 13, and the common electrode 13 is formed with slits 131. For example, the slits 131 of the common electrode 13 in each of the pixel units 30 have a shape of curved line, and the slits 131 are parallel to each other so as to form a slit region. The pattern profile of the pixel electrode 11 is parallel to the profile of the slit region, and the gate line 2 and/or the data line 5 are parallel to the pattern profile of the adjacent pixel electrodes.

Further, the pixel units 30 in this embodiment are arranged in a matrix.

Furthermore, the pixel units 30 are curved in the same direction, and the gate lines 2 of all pixel units 30 are located on the same side of the pixel units 30.

In this embodiment, the common electrode 13 of each of the pixel units 30 has curved slits, and the pattern profile of the pixel electrode 11 is parallel to the profile of the slit region of the common electrode in each pixel unit 30, thus it is possible to make the shape of the entire pixel unit be consistent with the produced electrical field, and make the electrical field produced uniformly in each of the pixel units uniform. The configuration enables the display difference in the edge region of the pixel units to be reduced, and the aperture ratio and the display contrast ratio to be increased. On the other hand, each of the pixel units can be divided into two parts at the position of the curved portion of the slits, and the liquid crystal molecules in the two parts can be rotated in two directions opposite to each other by driving of the voltage. As a result, "color shifting" at different viewing angles due to anisotropy of the refraction index of the liquid crystal molecules can be self-compensated and in turn the displaying property of the liquid crystal display device can be further improved.

Figure 5:
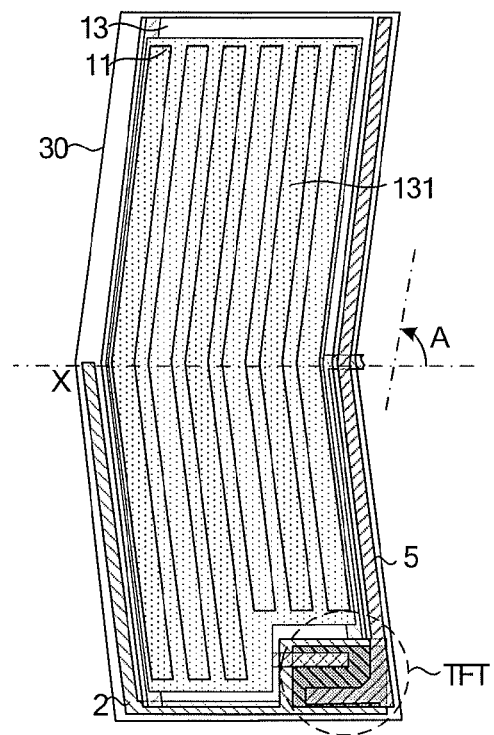
FIG. 5 is a plan-view schematic diagram showing a configuration of an array substrate according to a forth embodiment of the disclosure.
Figure 6:
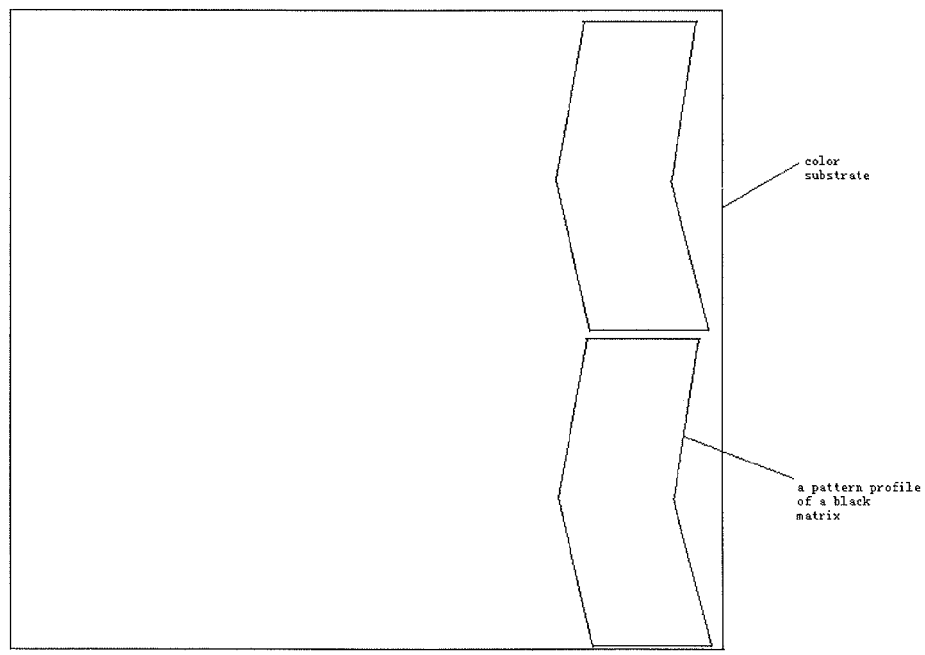
FIG. 6 is a plan-view schematic diagram showing a configuration of a color substrate according to an embodiment of the disclosure.

FIG. 5 is a plan-view schematic diagram showing a configuration of an array substrate according to the embodiment of the disclosure. In the above array substrates according to the first, second and third embodiments, an angle between the curved line of the slits 131 of the common electrode 13 and the long-side midline X of each pixel unit 30 may be in a range from 45° to 135°, preferably from 60° to 120°. The width of the slits 131 of the common electrode 13 may in a range of 2 to 10 μm, and the width of the strips of the transparent conduction material of the common electrode between the adjacent slits 131 may be in a range of preferably 2-10 μm.

Fourth Embodiment

A liquid crystal display device is provided according to the fourth embodiment of the disclosure. The liquid crystal display device comprises a liquid crystal panel. The liquid crystal panel can comprise a color filter substrate and any one of the array substrate according to the above embodiments of the disclosure disposed oppositely, with a liquid crystal layer interposed therebetween. The pattern profile of the black matrix on the color filter substrate and the pattern profile of the pixel electrodes in the pixel units on the array substrate are curved in the same direction.

Further, since each pixel of the liquid crystal display device corresponds to three sub-pixels of different color filter (RGB) on the color filter substrate, various colors can be displayed by combining the three sub-pixels at different gray scales, and each of the sub-pixels corresponds to one pixel unit 30 of the array substrate. In the pixel units of the array substrate according to the embodiment of the disclosure, since the pixel electrodes in the adjacent columns are displaced in a stagger manner, the pixel units in each of the adjacent columns are not displaced in the same row. If the pixel units corresponding to each one of the colors are displaced in the same column continuously, the color mixing of the color filter on the color filter substrate can take one or more selected from color mixing modes listed in following:

The pixel unit corresponding to a first color, the pixel unit at its top left corner corresponding to a second color, and the pixel unit at its top right corner corresponding to a third color are combined as one pixel to realize mixing of colors;

The pixel unit corresponding to the first color, the pixel unit at its down left corner corresponding to the second color, and the pixel unit at its down right corner corresponding to the third color B are combined as one pixel to realize mixing of colors;

The pixel unit corresponding to first color, the pixel unit at its down left corner corresponding to the second color, and the pixel unit at its top right corner corresponding to third color are combined as one pixel to realize mixing of colors;

The pixel unit corresponding to the first color, the pixel unit at its top left corner corresponding to the second color, and the pixel unit at its down right corner corresponding to the third color are combined as one pixel to realize mixing of colors.

For example, with reference to FIG. 3 in the above embodiments, the following color mixing modes can be obtained.

Color mixing mode A: the pixel unit corresponding to color G, the pixel unit at its top left corner corresponding to color R, the pixel unit at its top right corner corresponding to color B are combined as one pixel to realize mixing of colors;

Color mixing mode B: the pixel unit corresponding to color G, and the pixel unit at its down left corner corresponding to color R, and the pixel unit at its down right corner corresponding to color B are combined as one pixel to realize mixing of colors;

Color mixing mode C: the pixel unit corresponding to color G, the pixel unit at its down left corner corresponding to color R, and the pixel unit at its top right corner corresponding to color B are combined as one pixel to realize mixing of colors; and Color mixing mode D: the pixel unit corresponding to color G, the pixel unit at its top left corner corresponding to color R, and the pixel unit at its down right corner corresponding to color B are combined as one pixel to realize mixing of colors.

In the liquid crystal display device according to the embodiment of the disclosure, an angle between the rubbing direction of the array substrate and the long-side midline of the pixel units may be in the range from 80° to 100°; or an angle between the rubbing direction of the color filter substrate and the long-side midline of the pixel units may be in the range from –100° to –80°. When a positive type of liquid crystal material is used, an absorbing axis direction of the polarizer plate of the array substrate is parallel to the rubbing direction, and an absorbing axis direction of the polarizer plate of the color filter substrate is perpendicular to the rubbing direction.

The liquid crystal molecules are rotated under driving of the electrical potential difference between the pixel electrode 11 and the common electrode 13 in each pixel unit on the array substrate of the liquid crystal display device according to this embodiment. As shown in FIG. 2A, since a long axis of the liquid crystal molecules 20 in the liquid crystal layer is parallel to the rubbing direction, the polarized light transmitted through the polarizer plate of the array substrate does not change its polarizing direction after passing through the liquid crystal layer. On the other hand, since a transmittance axis of the polarizer plate of the color filter substrate is perpendicular to the transmittance axis of the polarizer plate of the array substrate, the polarized light can not pass through the polarizer plate of the color filter substrate, and the liquid crystal panel shows a black image. As shown in FIG. 2B, when an electrical field is applied, the liquid crystal molecules 20 in the liquid crystal layer are rotated in two directions opposite to each other, the polarized light transmitted through the polarizer plate of the array substrate can change its polarizing direction after passing through the liquid crystal layer and can be transmitted partly through the polarizer plate of the color filter substrate. As a result, the liquid crystal display device can provide different transmittance ratio under different driving voltages and display at different gray scales.

In this embodiment, the common electrode of each of the pixel units has curved slits, and the pattern profile of the pixel electrode is parallel to the profile of the slit region of the common electrode, thus it is possible to make the shape of the entire pixel unit be consistent with the produced electrical field, and make the electrical field inside of each of the pixel units uniform. The configuration enables to reduce the display difference in the edge region of the pixel units, such as the lower portion or the upper portion of the pixel units, which are adjacent to the gate line and the data line, and increases the aperture ratio and the display contrast ratio. On the other hand, the pixel units can be divided into two parts at the position of the curved portion of the slits, and the liquid crystal molecules of the two parts are rotated in two directions opposite to each other when driven by the voltage. As a result, "color shifting" at different viewing angles due to anisotropy of the refraction index of the liquid crystal molecules can be self-compensated and in turn the displaying property of the liquid crystal display device is further improved.

It should be appreciated that the embodiments described above are intended to illustrate but not limit the present disclosure. Although the present disclosure has been described in detail herein with reference to the preferred embodiments, it should be understood by those skilled in the art that the present disclosure can be modified and some of the technical features can be equivalently substituted without departing from the spirit and scope of the present disclosure.

What is claimed is:

1. An array substrate, comprising:
    a base substrate, and
    data lines and gate lines, which are orthogonal to each other to define a plurality of pixel units, formed in a pixel region of the base substrate, with each of the pixel units comprising a switching element, a pixel electrode and a common electrode,
    wherein the common electrode in each of the pixel units comprises slits, and the slits have a shape of fold line and are parallel to each other so as to form a slit region in the common electrode, and
    wherein the pattern profile of the pixel electrode is parallel to the profile of the slit region of the common electrode and the gate lines and/or the data lines are parallel to the pattern profile of adjacent pixel electrodes; the pixel electrode has a shape same to that of the slit, and the patterns of the pixel electrodes are curved opposite to each other in the pixel units of adjacent columns, and the pixel electrodes in the adjacent columns are displaced in a stagger manner so as to enable the curved patterns to match with each other.

2. The array substrate according to claim 1, wherein all the pixel units are arranged in a matrix.

3. The array substrate according to claim 2, wherein all the pixel units are curved in a same direction, and the gate lines of all the pixel units are located on a same side of the pixel units.

4. The array substrate according to claim 1, wherein an angle between the fold line of the slits of the common electrode and a long-side midline of the corresponding pixel unit ranges from 45° to 135°.

5. The array substrate according to claim 4, wherein the angle between the fold line of the slits of the common electrode and a long-side midline of the corresponding pixel unit ranges from 60° to 120°.

6. The array substrate according to claim 4, wherein a width of the slits of the common electrode ranges from 2 μm to 10 μm, and a width of strips of the common electrode between adjacent slits ranges from 2 μm to 10 μm.

7. The array substrate according to claim 1, wherein the common electrode is overlapped with the pixel electrode.

8. A liquid crystal display device, comprising:
    a liquid crystal panel, which comprises a color filter substrate and the array substrate that are disposed oppositely to each other,
    wherein a liquid crystal layer is interposed between the color filter substrate and the array substrate, and a pattern profile of a black matrix on the color filter substrate and a pattern profile of the pixel electrodes in the pixel units of the array substrate are curved in a same direction, and the array substrate comprises:
    a base substrate, and
    data lines and gate lines, which are orthogonal to each other to define a plurality of pixel units, formed in a pixel region of the base substrate, with each of the pixel units comprising a switching element, a pixel electrode and a common electrode,
    wherein the common electrode in each of the pixel units comprises slits, and the slits have a shape of fold line and are parallel to each other so as to form a slit region in the common electrode, and
    wherein the pattern profile of the pixel electrode is parallel to the profile of the slit region of the common electrode and the gate lines and/or the data lines are parallel to the pattern profile of adjacent pixel electrodes; the pixel electrode has a shape same to that of the slit, and the patterns of the pixel electrodes are curved opposite to each other in the pixel units of adjacent columns, and the pixel electrodes in the adjacent columns are displaced in a stagger manner so as to enable the curved patterns to match with each other.

9. The liquid crystal display device according to claim 8, wherein color filters on the color filter substrate is configured based on a following mixing color mode:
    a first unit pixel corresponding to a first color, a second pixel unit at the first pixel unit's top left corner corresponding to a second color, and a third pixel unit at the first pixel unit's top right corner corresponding to a third color, combined as one pixel;
    a first unit pixel corresponding to a first color, a second pixel unit at the first pixel unit's down left corner corresponding to a second color, and a third pixel unit at the first pixel unit's down right corner corresponding to a third color B, combined as one pixel;
    a first unit pixel corresponding to a first color, a second pixel unit at the first pixel unit's down left corner corresponding to a second color, and a third pixel unit at the first pixel unit's top right corner corresponding to a third color, combined as one pixel; or
    a first unit pixel corresponding to a first color, a second pixel unit at the first pixel unit's top left corner corresponding to the second color, and a third pixel unit at the first pixel unit's down right corner corresponding to a third color, combined as one pixel.

10. The liquid crystal display device according to claim 8, wherein both a rubbing direction of the array substrate and a rubbing direction of the color filter substrate are perpendicular to a short-side direction of the pixel units.

11. The liquid crystal display device according to claim 8, wherein an angle between a rubbing direction of the array substrate and a long-side midline of the pixel units ranges from 80° to 100°, and an angle between a rubbing direction of the color filter substrate and the long-side midline of the pixel units ranges from −100° to −80°.

12. The liquid crystal display device according to claim 8, wherein all the pixel units are arranged in a matrix.

13. The liquid crystal display device according to claim 12, wherein all the pixel units are curved in a same direction, and the gate lines of all the pixel units are located on a same side of the pixel units.

14. The liquid crystal display device according to claim 8, wherein an angle between the fold line of the slits of the common electrode and a long-side midline of the corresponding pixel unit ranges from 45° to 135°.

15. The liquid crystal display device according to claim 14, wherein the angle between the fold line of the slits of the common electrode and a long-side midline of the corresponding pixel unit ranges from 60° to 120°.

16. The liquid crystal display device according to claim 14, wherein a width of the slits of the common electrode ranges from 2 μm to 10 μm, and a width of strips of the common electrode between adjacent slits ranges from 2 μm to 10 μm.

* * * * *